Patented Aug. 13, 1935

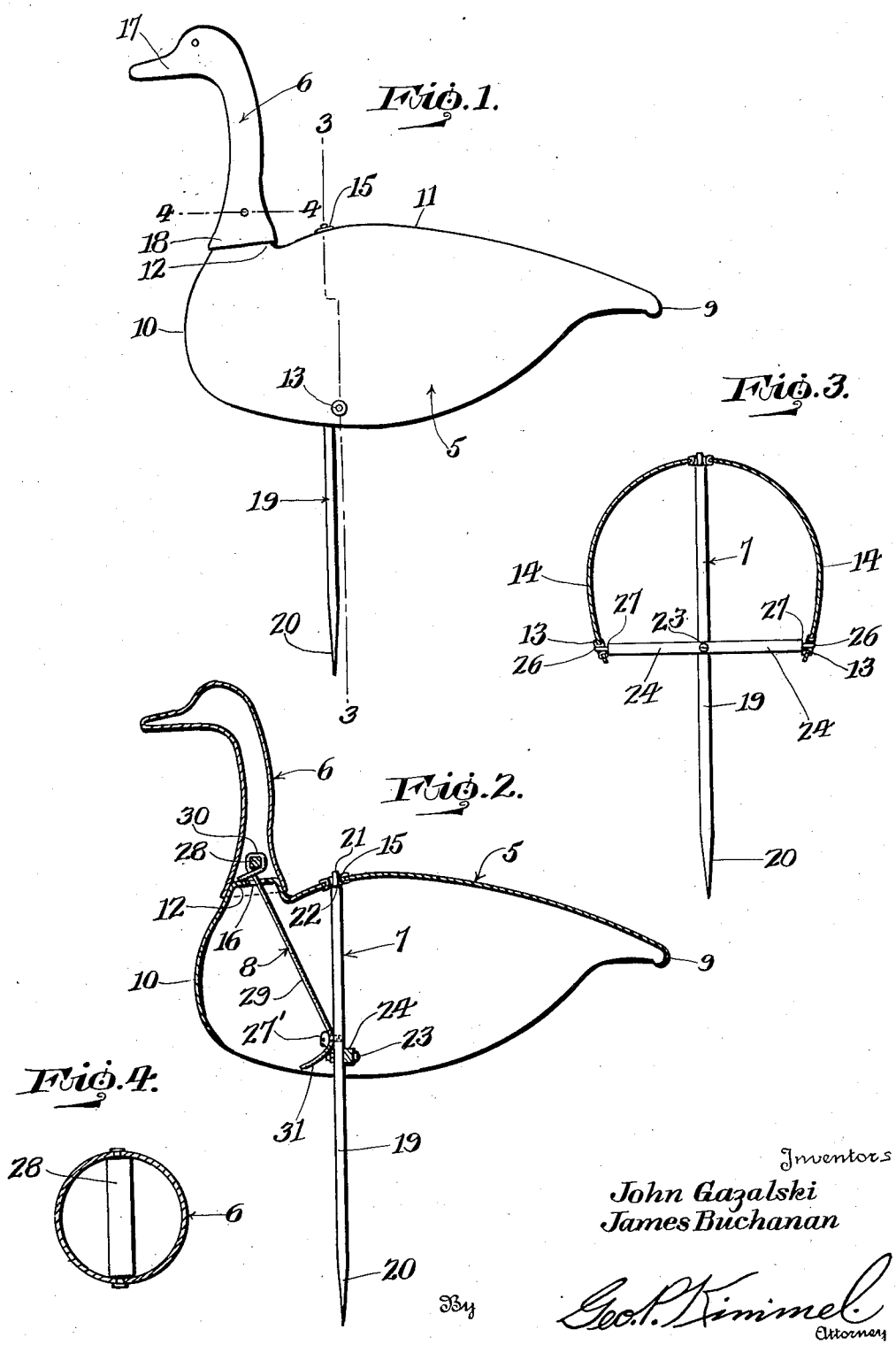

2,011,480

UNITED STATES PATENT OFFICE 2,011,480

GOOSE DECOY

John Gazalski and James Buchanan, Henryetta, Okla.

Application November 17, 1934, Serial No. 753,530

8 Claims. (Cl. 43—3)

This invention relates to a goose decoy and has for its object to provide, in a manner as hereinafter set forth a decoy of such class having means for removably anchoring it in an upstanding position with respect to the ground when employed for decoying purposes, and with the decoy capable of being folded in a compact manner when not in use.

A further object of the invention to provide, in a manner as hereinafter set forth a goose decoy of the knockdown type including a goose body simulating part, a goose neck simulating portion for telescopically disposing with respect to one end of said part, detachable means engaging with said part for removably anchoring it and the said portion in an upstanding position with respect to the ground and a resilient detachable connection for maintaining the goose neck simulating portion in superimposed relation with respect to the goose body simulating part.

A further object of the invention is to provide, in a manner as hereinafter set forth a goose decoy for detachably anchoring to the ground and having the elements thereof so constructed as to enable them to be detached from each other and capable of being folded in a compact manner with one of said elements receiving the others when the decoy is not desired for use.

A further object of the invention is to provide, in a manner as hereinafter set forth, a goose decoy including an open bottom goose body simulating part, a goose neck simulating portion for removably mounting upon such part, means within the said part and portion for detachably connecting them together and the said means being extendible from said part to constitute an upstanding support for said part and body to hold the decoy relative to the ground in decoying position.

Further objects of the invention are to provide, in a manner as hereinafter set forth, a goose decoy which is simple in its construction and arrangement, compact, durable, comparatively light in weight, readily assembled, thoroughly efficient in its use, and comparatively inexpensive to manufacture.

To the above ends essentially, and to others which may hereinafter appear, the invention consists of such parts, and such combination of parts as fall within the scope of the invention as claimed.

In the drawing:

Figure 1 is a side elevation of the goose decoy,
Figure 2 is a longitudinal sectional view thereof,
Figure 3 is a section on line 3—3, Figure 1, and
Figure 4 is a section on line 4—4, Figure 1.

The decoy includes a hollow body part 5 which is of a contour to simulate the appearance of the body of a goose, a hollow elongated tubular closed upper and open lower end member 6 of a contour to simulate the appearance of the neck, head and mouth of a goose, a foldable combined bracing and anchoring element 7 for bracing part 5 and detachably supporting the decoy in an upright or decoying position, and a resilient coupling element 8 for detachably connecting the member 6 upon the body part 5. The body part 5 and member 6 are formed of any suitable light weight material, preferably papier-maché and colored in any manner desired.

The body part 5 is of substantially inverted semi-oval contour in transverse section, open at its bottom throughout, increasing in width from the closed rear end 9 to its closed front end 10. The body part flares from the end 10 to a point between such end and the vertical median thereof and then tapers from the rear end of the flared portion to the rear end 9. The top 11 of the body part 5 is substantially upon an ogee curve and is formed at its forward end, centrally thereof with an upstanding frusto-conical boss 12. The body part 5 forwardly of and in proximity to its vertical median is provided with a pair of parallel spaced horizontal eyelets 13 positioned near the bottom edges of the sides 14 of the said body part. At the longitudinal median of the top 11 and rearwardly adjacent of the boss 12, the body part 5 is formed with an upstanding forwardly inclined eyelet 15 positioned slightly forward of the eyelets 13. The purpose of the eyelets 13 and 15 will be presently referred to. The upper end of boss 12 is provided axially thereof with a slot 16 for a purpose to be referred to.

The member 6 is of the length desired and is formed with a closed upper end and an open lower end. The upper portion 17 of member 6 is angularly disposed to and extends forwardly with respect to the remaining part of said member. The portion 17 simulates the appearance of the mouth and head of a goose. The lower end terminal portion 18 of member 6 is enlarged and tapered. When the decoy is set up the portion 18 of member 6 is disposed in telescopic relation with respect to boss 12.

The foldable combined bracing and anchoring element 7 consists of a supporting bar 19 of materially greater length than the height of body part 5. The bar 19 has a pointed lower end 20 for entrance into the ground or other support for the purpose of detachably anchoring the decoy in position when it is to be used. The bar 19, at its upper end is reduced, as at 21 for extension through the eyelet 15 and when so disposed, the shoulder 22 on the bar 19 at the inner end of the reduced upper end portion 21 abuts against the lower end of the eyelet 15. Pivotally connected against the rear side face of the bar 19, at a point between its transverse median and shoulder 22, as at 23 is a bracing bar 24 having reduced end portions 26 for extension through the eyelets 13. The shoulders 27, on the bar 24 at the inner ends of the reduced end portions 26 abut against the inner ends of the eyelets 13. The forward side face of bar 19 carries a detachable connecting member 27' for a purpose to be referred to. When the decoy is not in use the bars 19, 24 may be readily removed from the eyelets 15, 13 respectively, the bar 24 is folded upon bar 19 lengthwise of the rear side face of the latter and element 7 then stored within the body part 5. When the element 7 is in use the bar 19 extends at a slight inclination forwardly from its lower to its upper end with respect to body part 5.

The resilient coupling element 8 includes an anchoring piece 28 which is arranged within and disposed diametrically of the tapered lower end terminal portion 18 of member 6. The anchoring piece 28 is positioned at the upper end of portion 18 and disposed over the top of boss 12 when member 6 is mounted upon body part 5. The anchoring piece 28 is permanently secured to member 6. The elements 8 also includes a resilient strap 29 which is wrapped around and permanently secured at the end terminal portion 30 thereof to the anchoring piece 28. The strap 29 extends through the slot 16 in the top of boss 12 and is of a length to be detachably secured at selected points adjacent the end edge of the other terminal portion 31 thereof to the front side of bar 19 by the connecting member 27'.

When the body part 5 and member 6 are disposed in co-relation to simulate the appearance of a goose they will be arranged in the manner as shown in Figure 2, and are detachably connected together by the element 8 disposed relatively thereto and to element 7 in the manner as shown in Figure 2. When the decoy is in use it will be removably anchored in position and braced by the element 7 arranged relative to body part 5 and element 8 in the manner as shown in Figures 2 and 3.

When the decoy is not in use, the member 6 and element 7 are detached from and stored within body part 5.

When shipping, at least six body parts 5 may be nested in telescopic relation, and the anchors and heads which associate therewith are fitted into the upper body part 5 of said nest of body part. This foregoing arrangement provides for compact package for transportation.

What we claim is:

1. A goose decoy comprising a hollow body part, an upstanding hollow member detachably and telescopically mounted upon the top of said body part at the forward end thereof, a combined anchoring, supporting and bracing element detachably engaging in the sides and top of said body part, and a resilient coupling element having one end anchored within said member and its other end detachably connected to the said other element.

2. The invention set forth in claim 1 having the combined anchoring, supporting and bracing element thereof in the form of a pair of bars pivotally connected together intermediate their ends and one foldable upon the other, one of said bars having a reduced terminal portion at one end to detachably engage in the top of said body part and a shoulder at the inner end of said portion to abut the inner face of the top of said body part and the other of said bars having reduced end terminal portions to detachably engage in the sides of the body part, said bar having the reduced terminal portions provided with shoulders to abut the inner faces of the sides of said body part.

3. The invention as set forth in claim 1 having the combined anchoring, supporting and bracing element thereof in the form of a pair of bars pivotally connected together intermediate the ends thereof and one foldable upon the other, one of said bars carrying a means for detachably connecting the coupling element thereto.

4. The invention as set forth in claim 1 having the resilient coupling element thereof in the form of an anchoring piece secured within the hollow member and a resilient strap having one end terminal portion thereof secured to said anchoring piece.

5. In a goose decoy a body part simulating the appearance of the body of a goose, said body part being hollow, closed at its front, rear and top and open at the bottom, said body part at the forward end of its top being formed with an upstanding boss having a flat upper end formed with a slot, said boss being intersected centrally by the longitudinal median of the top of said body part, and said body part being provided in proximity to the bottom edge of each side thereof with a horizontally disposed eyelet and at the longitudinal median of its top and with an upstanding eyelet.

6. In a goose decoy a body part simulating the appearance of the body of a goose, said body part being hollow, closed at its front, rear and top and open at the bottom, said body part at the forward end of its top being formed with an upstanding boss having a flat upper end formed with a slot, said boss being intersected centrally by the longitudinal median of the top of said body part, and said body part being provided in proximity to the bottom edge of each side thereof with a horizontally disposed eyelet and at the longitudinal median of its top and with an upstanding eyelet, the eyelet in the top of said body part being arranged forwardly with respect to the eyelets in said sides.

7. In a goose decoy a body part simulating the appearance of the body of a goose, said body part being hollow, closed at its front, rear and top and open at the bottom, said body part at the forward end of its top being formed with an upstanding boss having a flat upper end formed with a slot, said boss being intersected centrally by the longitudinal median of the top of said body part, and said body part being provided in proximity to the bottom edge of each side thereof with a horizontally disposed eyelet and at the longitudinal median of its top and with an upstanding eyelet, the eyelet in the top of said body part being arranged forwardly with respect to the eyelets in said sides, and disposed at a forward inclination from its lower to its upper end.

8. A goose decoy comprising a hollow open bottom body part of a contour to simulate the appearance of the body of a goose, said body part being closed at top, front and rear and being formed at the forward end of its top with an upstanding frusto-conical boss, the top of said boss being formed with a slot, an elongated hollow member open at its one end and closed at its other end and being of a contour to simulate the appearance of the mouth, head and neck of a goose, said member having a tapered part at its open end for disposing in telescopic relation with respect to said boss, a combined anchoring, supporting and bracing element detachably engaging in the top and sides of said body part and extending from the open bottom of the latter, and a resilient coupling element anchored at one end in said tapered part, extending through said slot and detachably connected at its other end to the supporting and bracing element.

JOHN GAZALSKI.
JAMES BUCHANAN.